(12) United States Patent
Morin

(10) Patent No.: US 10,607,790 B2
(45) Date of Patent: Mar. 31, 2020

(54) DIRECT ELECTROLYTE GELLING VIA BATTERY SEPARATOR COMPOSITION AND STRUCTURE

(71) Applicant: Brian G. Morin, Greenville, SC (US)

(72) Inventor: Brian G. Morin, Greenville, SC (US)

(73) Assignee: Dreamweaver International, Inc., Grear, SC (US)

( * ) Notice: Subject to any disclaimer, the term of this patent is extended or adjusted under 35 U.S.C. 154(b) by 0 days.

(21) Appl. No.: 13/839,740

(22) Filed: Mar. 15, 2013

(65) Prior Publication Data
US 2014/0272599 A1    Sep. 18, 2014

(51) Int. Cl.
| | | |
|---|---|---|
| H01G 11/56 | (2013.01) | |
| H01G 11/52 | (2013.01) | |
| H01M 2/14 | (2006.01) | |
| H01M 2/16 | (2006.01) | |
| H01M 10/0565 | (2010.01) | |
| H01M 10/0525 | (2010.01) | |
| H01M 10/058 | (2010.01) | |

(52) U.S. Cl.
CPC ............. *H01G 11/56* (2013.01); *H01G 11/52* (2013.01); *H01M 2/145* (2013.01); *H01M 2/162* (2013.01); *H01M 10/0565* (2013.01); *H01M 10/058* (2013.01); *H01M 10/0525* (2013.01); *H01M 2300/0085* (2013.01); *Y02E 60/13* (2013.01); *Y10T 29/49108* (2015.01)

(58) Field of Classification Search
CPC ....... H01G 11/56; H01G 11/52; H01M 2/145; H01M 2/162; H01M 10/0565; H01M 10/0525; H01M 10/058; H01M 2300/085; Y10T 29/417; Y10T 29/49109; Y10T 29/49108; Y02E 60/13
USPC .................. 429/246, 247; 361/502
See application file for complete search history.

(56) References Cited

U.S. PATENT DOCUMENTS

| | | | |
|---|---|---|---|
| 4,767,687 A | 8/1988 | LaBonte et al. | |
| 4,987,024 A | 1/1991 | Greenberg et al. | |
| 5,075,990 A | 12/1991 | Greenberg et al. | |
| 5,230,949 A | 6/1993 | Howard et al. | |
| 5,290,645 A | 3/1994 | Tanaka et al. | |
| 5,418,091 A * | 5/1995 | Gozdz | C08J 9/28 429/252 |
| 5,665,265 A | 9/1997 | Gies et al. | |
| 5,888,916 A | 3/1999 | Tadokoro et al. | |
| 5,902,696 A | 5/1999 | Smesko et al. | |
| 5,935,884 A | 8/1999 | Williams et al. | |
| 5,948,569 A * | 9/1999 | Moses | H01M 2/16 29/623.1 |
| 5,962,161 A | 10/1999 | Zucker | |
| 6,063,142 A * | 5/2000 | Kawakami | H01M 4/04 29/623.5 |
| 6,108,879 A | 8/2000 | Forte et al. | |
| 6,110,588 A | 8/2000 | Perez et al. | |
| 6,114,068 A * | 9/2000 | Yamada et al. | 429/300 |
| 6,120,939 A | 9/2000 | Whear | |
| 6,291,105 B1 | 9/2001 | Yamamoto et al. | |
| 6,315,806 B1 * | 11/2001 | Torobin et al. | 55/522 |
| 6,392,867 B1 * | 5/2002 | Yamada et al. | 361/502 |
| 6,395,428 B1 * | 5/2002 | Kezuka | 429/300 |
| 6,432,586 B1 | 8/2002 | Zhang | |
| 6,444,367 B1 | 9/2002 | Kinn et al. | |
| 6,495,292 B1 | 12/2002 | Yen | |
| 6,641,954 B2 | 11/2003 | Weerts et al. | |
| 6,689,509 B2 | 2/2004 | Zucker | |
| 6,692,868 B2 | 2/2004 | Zucker | |
| 6,703,161 B2 | 3/2004 | Zucker | |
| 6,770,401 B1 | 8/2004 | Clough | |
| 6,866,912 B2 | 3/2005 | Higgins et al. | |
| 6,872,311 B2 | 3/2005 | Koslow | |
| 6,905,798 B2 | 6/2005 | Tsukuda et al. | |
| 7,033,704 B2 | 4/2006 | Sato et al. | |
| 7,033,705 B2 * | 4/2006 | Yamaguchi | D06M 13/192 429/247 |
| 7,063,917 B2 | 6/2006 | Kinn et al. | |
| 7,070,884 B2 | 7/2006 | Thompson et al. | |
| 7,074,483 B2 | 7/2006 | Morin | |
| 7,087,343 B2 | 8/2006 | Shi et al. | |
| 7,112,389 B1 | 9/2006 | Arora et al. | |

(Continued)

FOREIGN PATENT DOCUMENTS

| | | | | |
|---|---|---|---|---|
| JP | 2003257486 A | * | 9/2003 | |
| WO | 0189022 | | 11/2001 | |
| WO | WO 0189023 A1 | * | 11/2001 | ........ H01M 10/0431 |
| WO | WO 2009085679 A1 | * | 7/2009 | |
| WO | WO-2011033975 A1 | * | 3/2011 | ............ H01M 2/145 |

OTHER PUBLICATIONS

J-PLAT Pat Machine Translation of the Detailed Description of JP 2003-257486 (Sep. 2003).*

*Primary Examiner* — Gregg Cantelmo

(74) *Attorney, Agent, or Firm* — William S. Parks

(57) ABSTRACT

The capability of directly gelling an electrolyte within a lithium ion (or similar type) battery cell through the reaction of the electrolyte solution with a present battery separator is provided. Such a procedure results generally from the presence of suitable nanofibers within the battery separator structure that exhibit the potential for swelling in the presence of a suitable electrolyte formulation. In this manner, the capability of providing an entrenched gel within the battery separator for longer term viability and electrical generation is possible without externally gelling the electrolyte prior to battery cell introduction. The method of use of such a resultant battery, as well as the battery including such an automatic gelling battery separator/electrolyte combination, are also encompassed within this invention.

2 Claims, 8 Drawing Sheets

(56) References Cited

U.S. PATENT DOCUMENTS

| | | |
|---|---|---|
| 7,170,739 B1 | 1/2007 | Arora et al. |
| 7,211,322 B2 | 5/2007 | Pekala |
| 7,238,413 B2 | 7/2007 | Edwards et al. |
| 7,297,251 B2 | 10/2007 | Yun et al. |
| 7,402,539 B2 | 7/2008 | Takase et al. |
| 7,591,883 B2 | 9/2009 | Kameoka et al. |
| 7,717,975 B2 | 5/2010 | Kalayci et al. |
| 7,754,123 B2 | 7/2010 | Verdegan et al. |
| 7,789,930 B2 | 9/2010 | Ensor et al. |
| 7,790,321 B2 | 9/2010 | Hennige et al. |
| 7,923,143 B2 | 4/2011 | Tanaka et al. |
| 7,981,818 B2 | 7/2011 | Justice |
| 8,470,898 B2 | 6/2013 | Huang et al. |
| 8,477,748 B2 | 7/2013 | Hayakawa et al. |
| 8,557,444 B2 | 10/2013 | Arora et al. |
| 8,697,587 B2 | 4/2014 | Arora et al. |
| 2002/0090876 A1* | 7/2002 | Takase ............... D21H 13/14 442/363 |
| 2003/0113619 A1 | 6/2003 | Zucker |
| 2003/0180622 A1 | 9/2003 | Tsukuda et al. |
| 2004/0222552 A1 | 11/2004 | Housler et al. |
| 2005/0014063 A1 | 1/2005 | Shi et al. |
| 2006/0154140 A1 | 7/2006 | Yamamoto et al. |
| 2006/0188786 A1 | 8/2006 | Lee et al. |
| 2006/0194100 A1* | 8/2006 | Tanaka ............... D04H 1/48 429/142 |
| 2006/0286446 A1* | 12/2006 | Chun et al. ............... 429/142 |
| 2007/0287062 A1* | 12/2007 | Tsukuda ............... H01G 9/02 429/129 |
| 2008/0070463 A1 | 3/2008 | Arora et al. |
| 2008/0172167 A1 | 7/2008 | Kritzer |
| 2008/0241459 A1 | 10/2008 | Higgins et al. |
| 2009/0261035 A1 | 10/2009 | Arora et al. |
| 2009/0324925 A1 | 12/2009 | Conley et al. |
| 2010/0092853 A1 | 4/2010 | Ito et al. |
| 2010/0124705 A1* | 5/2010 | Naoi et al. ............... 429/306 |
| 2010/0136865 A1 | 6/2010 | Bletsos et al. |
| 2010/0173156 A1 | 7/2010 | Morin |
| 2010/0195270 A1* | 8/2010 | Hayakawa et al. ............ 361/502 |
| 2010/0229516 A1 | 9/2010 | Fox et al. |
| 2010/0233523 A1* | 9/2010 | Jo et al. ............... 429/144 |
| 2010/0310921 A1 | 12/2010 | Hayakawa et al. |
| 2011/0079553 A1 | 4/2011 | Thomson et al. |
| 2011/0117439 A1 | 5/2011 | Yamada et al. |
| 2011/0143207 A1 | 6/2011 | Arora et al. |
| 2011/0143217 A1 | 6/2011 | Arora et al. |
| 2011/0165459 A1 | 7/2011 | Halalay et al. |
| 2011/0171523 A1 | 7/2011 | Samii et al. |
| 2011/0171535 A1 | 7/2011 | Ohinshi et al. |
| 2011/0217538 A1 | 9/2011 | Miura et al. |
| 2011/0217539 A1 | 9/2011 | Bonner et al. |
| 2011/0229750 A1 | 9/2011 | McLellan et al. |
| 2011/0262817 A1 | 10/2011 | Tanaka et al. |
| 2012/0003524 A1 | 1/2012 | Jo et al. |
| 2012/0028086 A1 | 2/2012 | Shi et al. |
| 2012/0122011 A1 | 5/2012 | Zou et al. |
| 2012/0164514 A1* | 6/2012 | Hayakawa ............ H01M 2/145 429/144 |
| 2012/0177976 A1 | 7/2012 | Wensley et al. |
| 2012/0183862 A1 | 7/2012 | Gupta et al. |
| 2012/0295165 A1* | 11/2012 | Morin et al. ............... 429/247 |
| 2013/0017431 A1 | 1/2013 | Frisk et al. |
| 2013/0065052 A1 | 3/2013 | Morin |
| 2013/0065133 A1 | 3/2013 | Suzuki et al. |
| 2013/0078525 A1 | 3/2013 | Morin et al. |
| 2013/0164629 A1 | 6/2013 | Hou et al. |
| 2014/0134496 A1 | 5/2014 | Morin |
| 2014/0141336 A1 | 5/2014 | Morin |
| 2014/0141337 A1 | 5/2014 | Morin |

\* cited by examiner

US 10,607,790 B2

DIRECT ELECTROLYTE GELLING VIA BATTERY SEPARATOR COMPOSITION AND STRUCTURE

FIELD OF THE INVENTION

The present invention relates to the capability of directly gelling an electrolyte within a lithium ion (or similar type) battery cell through the reaction of the electrolyte solution with a present battery separator. Such a procedure results generally from the presence of suitable nanofibers within the battery separator structure that exhibit the potential for swelling in the presence of a suitable electrolyte formulation. In this manner, the capability of providing an entrenched gel within the battery separator for longer term viability and electrical generation is possible without externally gelling the electrolyte prior to battery cell introduction. The method of use of such a resultant battery, as well as the battery including such an automatic gelling battery separator/electrolyte combination, are also encompassed within this invention.

BACKGROUND OF THE INVENTION

Batteries have been utilized for many years as electrical power generators in remote locations. Through the controlled movement of ions between electrodes (anode and cathode), a power circuit is generated, thereby providing a source of electricity that can be utilized until the excess ions in one electrode are depleted and no further electrical generation is possible. In more recent years, rechargeable batteries have been created to allow for longer lifetimes for such remote power sources, albeit through the need for connecting such batteries to other electrical sources for a certain period of time. All in all, however, the capability of reusing such a battery has led to greater potentials for use, particularly through cell phone and laptop computer usage and, even more so, to the possibility of automobiles that solely require electricity to function.

Such batteries typically include at least five distinct components. A case (or container) houses everything in a secure and reliable manner to prevent leakage to the outside as well as environmental exposure inside. Within the case are an anode and a cathode, separated effectively by a separator, as well as an electrolyte solution (low viscosity liquid) that transport ions through the separator between the anode and cathode. The rechargeable batteries of today and, presumably tomorrow, will run the gamut of rather small and portable devices, but with a great deal of electrical generation potential in order to remain effective for long periods between charging episodes, to very large types present within automobiles, as an example, that include large electrodes (at least in surface area) that must not contact one another and large number of ions that must consistently and constantly pass through a membrane to complete the necessary circuit, all at a level of power generation conducive to providing sufficient electricity to run an automobile motor. As such, the capability and versatility of battery separators in the future must meet certain requirements that have yet to be provided within the current industry.

Generally speaking, battery separators have been utilized since the advent of closed-cell batteries to provide necessary protection from unwanted contact between electrodes as well as to permit effective transport of electrolytes within power generating cells. Typically, such materials have been of film structure, sufficiently thin to reduce the weight and volume of a battery device while imparting the necessary properties noted above at the same time. Such separators must exhibit other characteristics, as well, to allow for proper battery function. These include chemical stability, suitable porosity of ionic species, effective pore size for electrolyte transfer, proper permeability, effective mechanical strength, and the capability of retaining dimensional and functional stability when exposed to high temperatures (as well as the potential for shutdown if the temperature rises to an abnormally high level).

In greater detail, then, the separator material must be of sufficient strength and constitution to withstand a number of different scenarios. Initially, the separator must not suffer tears or punctures during the stresses of battery assembly. In this manner, the overall mechanical strength of the separator is extremely important, particularly as high tensile strength material in both the machine and cross (i.e., transverse) directions allows the manufacturer to handle such a separator more easily and without stringent guidelines lest the separator suffer structural failure or loss during such a critical procedure. Additionally, from a chemical perspective, the separator must withstand the oxidative and reductive environment within the battery itself, particularly when fully charged. Any failure during use, specifically in terms of structural integrity permitting abnormally high amounts of current to pass or for the electrodes to touch, would destroy the power generation capability and render the battery totally ineffective. Thus, even above the ability to weather chemical exposure, such a separator must also not lose dimensional stability (i.e., warp or melt) or mechanical strength during storage, manufacture, and use, either, for the same reasons noted above.

Simultaneously, however, the separator must be of proper thickness to, in essence, facilitate the high energy and power densities of the battery, itself. A uniform thickness is quite important, too, in order to allow for a long life cycle as any uneven wear on the separator will be the weak link in terms of proper electrolyte passage, as well as electrode contact prevention.

Additionally, such a separator must exhibit proper porosity and pore sizes to accord, again, the proper transport of ions through such a membrane (as well as proper capacity to retain a certain amount of liquid electrolyte to facilitate such ion transfer during use). The pores themselves should be sufficiently small to prevent electrode components from entering and/or passing through the membrane, while also allowing, again, as noted above, for the proper rate of transfer of electrolyte ions. As well, uniformity in pore sizes, as well as pore size distribution, provides a more uniform result in power generation over time as well as more reliable long-term stability for the overall battery as, as discussed previously, uniform wear on the battery separator, at least as best controlled in such a system, allows for longer life-cycles. It additionally can be advantageous to ensure the pores therein may properly close upon exposure to abnormally high temperatures to prevent excessive and undesirable ion transfer upon such a battery failure (i.e., to prevent fires and other like hazards).

As well, the pore sizes and distributions may increase or decrease the air resistance of the separator, thus allowing for simple measurements of the separator that indicate the ability of the separator to allow adequate passage of the electrolyte present within the battery itself. For instance, mean flow pore size can be measured according to ASTM E-1294, and this measurement can be used to help determine the barrier properties of the separator. Thus, with low pore size, the rigidity of the pores themselves (i.e., the ability of the pores to remain a certain size during use over time and upon exposure to a set pressure) allows for effective control of electrode separation as well. More importantly, perhaps, is the capability of such pore size levels to limit dendrite formation in order to reduce the chances of crystal formation on an anode (such a lithium crystals on a graphite anode) that would deleteriously impact the power generation capability of the battery over time.

There is also great concern with the dimensional stability of such a separator when utilized within a typical lithium ion cell, as alluded to above. The separator necessarily provides a porous barrier for ion diffusion over the life of the battery, certainly. However, in certain situations, elevated temperatures, either from external sources or within the cell itself, may expose susceptible separator materials to undesirable shrinking, warping, or melting, any of which may deleteriously affect the capability of the battery over time. As such, since reduction of temperature levels and/or removal of such battery types from elevated temperatures during actual utilization are very difficult to achieve, the separator itself should include materials that can withstand such high temperatures without exhibiting any appreciable effects upon exposure. Alternatively, the utilization of combinations of materials wherein one type of fiber, for instance, may provide such a beneficial result while still permitting the separator to perform at its optimum level, would be highly attractive.

Furthermore, the separator must not impair the ability of the electrolyte to completely fill the entire cell during manufacture, storage and use. Thus, the separator must exhibit proper wicking and/or wettability during such phases in order to ensure the electrolyte in fact may properly transfer ions through the membrane; if the separator were not conducive to such a situation, then the electrolyte would not properly reside on and in the separator pores and the necessary ion transmission would not readily occur. Additionally, it is understood that such proper wettability of the separator is generally required in order to ensure liquid electrolyte dispersion on the separator surface and within the cell itself. Non-uniformity of electrolyte dispersion may result in dendritic formations within the cell and on the separator surface, thereby creating an elevated potential for battery failures and short circuiting therein.

Additionally, the efficiency of an electrolyte to continuously and reliably generate sufficient electrical power within a battery cell is highly dependent on the delivery rate thereof across a separator membrane. Typically, to allow for better efficiencies in such a situation, electrolyte formulations include multiple solvents, rather than a single type. In that manner, the multiple solvent solution allows for the depletion of one electrolyte with compensation by another. The different chemical structures, however, tend to alter the level of electrical generation in such a scenario, at least at times, and the ability to provide a stable membrane transfer (and then return to create a charged battery) may be compromised through this necessary combination of species. In any event, the potential to allow for greater amounts of certain electrolyte structures without reducing the overall effectiveness and thus the potential to accord a longer period of charge depletion before charging is necessary, would be highly prized within this industry. To date, the only way such has been possible is the utilization of a pre-gelled electrolyte solution that is rather difficult to properly introduce within a battery cell and, consequently, requires a certain time period to properly constitute over and through a battery separator. Likewise, with typical polypropylene structures, gelled electrolytes must be provided in this external fashion and do not readily react for long-term stability. All in all, the basic problems faced with the known beneficial properties accorded the industry with gelled electrolyte formulations have not been improved upon in the past. Although the ability to potentially, at least, control electrolyte membrane transfer through a gelled state is significant, the problems associated with such a gelling requirement have yet to optimize such a platform within the battery industry.

To date, however, as noted above, the standards in place today do not comport to such critical considerations, particularly as it concerns any manner of improving the capability of gelling an electrolyte formulation in situ, rather than externally for cell introduction thereafter. The general aim of an effective battery separator is to provide such beneficial characteristics all within a single thin sheet of material; no discussion has ever been made as to the electrolyte gelling capacity of such an already in-place battery component. As such, there exists a significant need to improve upon the methods of incorporating gelled electrolyte formulations within battery cells for greater efficiency, longer charge capacity, and easier application during manufacture, at least. Combined with the potential for a suitable battery separator that exhibits proper pore size, dimensional stability, and other versatile end results (i.e., air resistance, for example) as well as necessary levels of mechanical properties, heat resistance, permeability, dimensional stability, shutdown properties, and meltdown properties, the potential for a one-size-fits-all approach would be of great interest within the rechargeable battery separator industry. As of today, nothing has been provided to that extent.

ADVANTAGES AND SUMMARY OF THE INVENTION

A distinct advantage of the present invention is the ease in manufacturing through a wet-laid nonwoven fabrication process. Another distinct advantage is the resulting capability of providing any targeted level of pore size, porosity, and air resistance, through the mere change in proportions of component fibers utilized during the fabrication process, as well as the proper calendering of the produced single layer material. Yet another advantage of this inventive battery separator is the isotropic strength properties accorded the user for reliability in long-term use as well as during the battery manufacturing phase. The ability of the inventive separator to provide contemporaneous low air resistance and low pore sizes is still a further advantage of this invention. Yet another advantage of this inventive battery separator is the provision of a specifically non-conductive (and thus insulating) fabric (or paper) that does not allow transmission of electrical charge through the separator body, but solely through the transport of charged ions through the pores present within its structure. Yet another advantage is the high porosity of the material, allowing more ions to flow and increasing the durability of the ability to hold energy over many life cycles by allowing fully recharged electrodes. Other advantages include, without limitation, the ability to dial in certain physical characteristics through the proper selection of fibrous materials prior to layer formation, as well as the utilization of all micro fibers initially and the generation of nanofibers (in fibrillated form) through high shear treatment thereof and thus the capability of forming all the necessary separator components from a single starting material. Another very significant advantage of the inventive process and system is the capability of the battery separator structure to accord internal gelling of a liquid electrolyte formulation without the need for pre-gelling. Another advantage of this type is the highly desirable result of direct gelling inside the battery separator thus delivering such a properly structured electrolyte formulation to the exact internal component for which gelled electrolyte is most beneficial.

Accordingly, this invention pertains to a method of providing direct electrolyte formulation gelling inside a battery separator through the presence of a plurality of selectively soluble nanofibers that exhibit swelling capacity in the presence of said electrolyte formulation. Also encompassed within this invention is a rechargeable battery that is produced through the method of supplying a liquid electrolyte therein in a non-gelled state and upon contact with the battery separator component of said rechargeable battery said liquid electrolyte exhibits a gelling characteristics at the surface of said battery separator. Additionally, encompassed herein is an electric double layer capacitor comprising a separator and an electrolyte that is produced through the method of supplying a liquid electrolyte therein in a non-gelled state and upon contact with the separator component of said electric double layer capacitor said liquid electrolyte exhibits a gelling characteristic in said separator.

The inventive methods (and thus the battery included within such a method) includes the presence of a suitable polymeric battery separator comprising a nonwoven combination of microfibers and nanofibers wherein at least a portion of the nanofibers exhibit a proper swelling characteristic in the presence of at least one electrolyte component. The utilization of a nanofiber in this manner thus allows for the retention of such a nanofiber structure within the separator itself and, upon exposure to an electrolyte that exhibits the suitable solubility/swelling requirements noted above, at least a portion of such nanofiber constituents will swell thereby producing the gelling effect for the electrolyte as described. Beneficially, then, is the potential that the overall battery separator utilized for such a purpose also includes a single layer structure to allow for more effective electrolyte transfer potential over the membrane. In this manner, then, such a single layer separator may exhibit other beneficial properties such as, for instance, an isotropic tensile strength with the machine direction tensile strength less than three times the cross direction tensile strength, a bimodal distribution of fiber length with the average microfiber length is greater than five times the average nanofiber length, and a mean flow pore size less than 0.80 μm (and potentially preferably nonwoven in nature to provide greater access for electrolyte contact with the nanofiber constituents therein).

Such an inventive separator can also exhibit a machine direction (MD) tensile strength greater than 90 kg/cm$^2$ and less than 1,000 kg/cm$^2$, a cross direction (CD) tensile strength greater than 30 kg/cm$^2$ and less than 1,000 kg/cm$^2$, and a mean flow pore size less than 0.80 μm. Furthermore, such an invention includes a battery separator as defined and comprising a single layer of fibers, said layer comprising both nanofibers and microfibers, said nanofibers having an average maximum width less than 1000 nm, said microfibers having a maximum width greater than 3000 nanometers, and said nanofibers and microfibers intermingled such that at least a portion of said nanofibers reside in the interstices between said microfibers.

Such a battery separator thus preferably exhibits a maximum thickness of 250 microns, and includes a combination of microfiber and nanofiber constituents. The separator may be produced through a method comprising the steps of a) providing an aqueous solvent; b) introducing therein a plurality of nanofibers and a plurality of microfibers to form a microfiber/nanofiber dispersion within an aqueous solvent; c) mixing said microfiber/nanofiber dispersion under high shear conditions; d) introducing said highly sheared dispersion within a paper making machine; e) producing a web of microfiber/nanofiber material; and f) drying said web. The method including a further process step of treating such a web by with a calendering procedure to produce a separator material exhibiting a thickness of at most 100 microns and a pore size of at most 2000 nm, is also contemplated. In each of these instances, however, is the necessity to include a certain amount of nanofiber constituent that will effectively and reliably gel a specific electrolyte species when introduced within a battery cell. Thus, although these are rather specific conditions, the actual inventive quality of the methods encompassed herein are importantly directed by the selection of an electrolyte and the potential to thereby target a certain gelling level and result at the electrolyte separator interface. Thus, although the utilization of nanofibers in general as battery separators may have been contemplated in the past, the single layer structures allowing for nanofiber availability for such a gelling result has, again, heretofore remained unexplored. Thus, the realization that a certain gelling result is desired and can be made available through proper nanofiber incorporation in a proper single-layer separator structure, is highly unexpected and extremely beneficial for the rechargeable battery industry.

Throughout this disclosure, the term microfiber is intended to mean any polymeric fiber exhibiting a width that is measured in micrometers, generally having a maximum width greater than 1000 nm, but also greater than 3000 nm, or even greater than 5000 nm or possibly even greater than 10,000 nm, up to about 40 microns. As well, the term nanofiber is intended to mean any polymeric fiber exhibiting a width that is measured in nanometers, generally having a maximum width less than 1000 nm, but possibly less than 700 nm, or even less than 500 nm or possibly even less than 300 nm (as low as about 1 nm). For either micro fiber or nanofiber materials, it should be understood that width may be considered diameter, although in such a situation, diameter would be considered a mean diameter since uniformity of fiber structure is typically very difficult to achieve. Thus, maximum width is utilized as the primary definition, particularly if the fibers themselves are not cylindrical in shape, thus allowing for the possibility of square, rectangle, triangle, or other geometric shape(s) for such fibers, which would all be within the scope of breadth of this invention as long as the proper micro- and nano-fiber measurements are present. As well, the term insulating in intended to indicate no appreciable degree of electrical conductivity, and thus the inventive fabric structure does not permit electrical charge throughout the fabric body, but only through the passage of electrolytic ions through the pores present therein.

Such a combination of microfibers and nanofibers has yet to be investigated within the battery separator art, particularly in terms of the capability of providing a single-layer nonwoven fabric of the two base components for such a purpose, not to mention the potential to dial-in gelling levels for electrolytes after battery cell introduction. The combination is particularly important for a variety of reasons as it provides a nonwoven with a bimodal distribution of fiber diameters and lengths, such that the average length of the microfiber constituents is at least 5 times the average length of the nanofiber constituents, preferably more than 10 times and most preferably more than 20 times. Additionally, the average fiber diameters are also in a bimodal distribution, such that the average diameter of the microfibers is more than 3 times the average diameter of the nanofibers, preferably more than 5 times the average diameter of the nanofibers, and most preferably more than 10 times the average diameter of the nanofibers. This bimodal distribution allows the microfibers to provide strength, loft, permeability, modulus, tear and puncture resistance, wet strength, processability, and other features to the single layer separator that the nanofibers alone could not provide. This type of structure thus provides a certain degree of availability, as well, for electrolyte contact to effectuate the desired swelling results for gelling to occur at the separator surface as well as, potentially, through the entire structure via the pores created therein by the nanofiber structures.

The microfiber constituent may be of any suitable polymer that provides the necessary chemical and heat resistance alluded to above, as well as the capability of forming a microfiber structure. As well, such a microfiber may also be fibrillated (or treated in any other like manner, such as through plasma exposure, and the like) during or subsequent to fiber formation in order to increase the surface area thereof to facilitate the desired entangling between a plurality of such microfibers during a nonwoven fabrication process. Such polymeric components may thus include acrylics such as polyacrylonitrile, polyolefins such as polypropylene, polyethylene, polybutylene and others including copolymers, polyamides, polyvinyl alcohol, polyethylene terephthalate, polybutylene terephthalate, polysulfone, polyvinyl fluoride, polyvinylidene fluoride, polyvinylidene fluoride-hexafluoropropylene, polymethyl pentene, polyphenylene sulfide, polyacetyl, polyurethane, aromatic polyamide, semi-aromatic polyamide, polypropylene terephthalate, polymethyl methacrylate, polystyrene, cellulosic polymers (rayon, as one non-limiting example), polyaramids, including para-aramids and meta-aramids, and blends, mixtures and copolymers including these polymers. Polyacrylates, cellulosic polymers, and polyaramids are potentially preferred. Such materials provide a range of highly desirable properties that function in combination with the properties of the other polymer types to accord overarching beneficial results in terms of tensile strength, high temperature protection, wettability, and pore size capability, particularly when included as nanofiber components with like microfiber bases. Such microfibers may also be pretreated with adhesives to effectuate the desired degree of contact and dimensional stability of the overall nonwoven structure subsequent to fabrication.

Additionally, the microfibers may be selected in terms of individual fiber properties to provide combinations of materials that accord desirable characteristics to the overall battery separator. Thus, since poly-aramid, meta-aramid, and cellulosic fibers provide excellent heat resistance and certain strength benefits, such fibers may be incorporated individually (as wet-laid constituents, for example) or in combination through entanglement or other means. Such fibers must be of sufficient length to impart the necessary strength to the overall separator but short enough to permit proper incorporation (such as, again, for instance, within a wet-laid procedure). For instance, the microfiber constituents may preferably be longer than 0.5 mm, more preferably longer than 1 mm, and most preferably longer than 2 mm.

Microfibers or nanofibers may preferentially be of a material that will melt or flow under pressure or high temperature. It is of particular benefit to have one constituent which will melt or flow at a temperature that is lower than the other constituents. For example, polyester microfibers can be made to flow at temperatures approaching the melt temperature of 260° C. Additionally, polyacrylonitrile microfibers or nanofibers can be made to flow under high pressure and temperature. Cellulose, rayon, aramid, and other micro- or nanofibers will not flow under these temperatures. Thus, a combination of materials comprising at least one fiber that will flow under high temperature and/or pressure and at least one fiber that will not flow under the same temperature and/or pressure will enable the first fiber to bond the other fibers together, imparting additional strength to the nonwoven separator. Additionally, such nanofiber structures may exhibit the necessary swelling benefits at the separator surface in the presence of any number of possible electrolytes. Polyacrylonitrile, for example, exhibits a suitable gelling result upon sufficient exposure to propylene carbonate and ethylene carbonate. Polyaramid appears to do the same in the presence of dimethyl carbonate, and so on. Other polymers that have in the past been used as solid or gelled electrolytes for lithium ion batteries, but not in the nanofiber form and not gelled in situ, include polyethylene oxide (PEO), poly methyl methacrylate (PMMA), poly vinyl chloride (PVC) polyvinyl pyrrolidinone (PVP), polyvinylidene carbonate (PVDC), polycarbonate (PC) and poly vinylidene fluoride (PVDF), including copolymers comprising the monomers from these polymers. These are suitable polymers, but also suitable would be any polymer that absorbs a solvent that is suitable for use as a component of electrolyte in lithium ion batteries, or in electric double layer capacitors. Examples of these solvents include propylene carbonate, ethylene carbonate, diethyl carbonate, dimethyl carbonate, acetonitrile, ethyl methyl carbonate, fluoromethylene carbonate, and vinylene carbonate. In addition, it may be preferable to have two types of nanofibers present, one selected from the group of polymers that exhibits gelation in the solvents that constitute the electrolyte, and one that is not selected from this group. In this embodiment, the non-soluble nanofibers may form a reinforcing matrix within the gelled nanofibers, giving enhanced structural properties and increasing the durability and/or longevity of the battery in aggressive use situations. Thus, the potential for such effective battery separator strength, dimensional stability, shrinkage, etc., characteristics, as well as the propensity to "donate" nanofiber constituents as swelling (or otherwise solubilizing) species in the presence of specific electrolytes, without compromising such important separator requirements, is highly unexpected.

The nanofibers may thus be of any like polymer constituency and/or combination in order to withstand the same types of chemical and high temperature exposures as for the microfibers. Due to their size, there is no requirement of post-manufacture treatment of such nanofiber materials to accord any increase in entanglement on the produced nonwoven surface or within the interstices thereof. Nanofiber generation, however, may be provided through a high shear treatment of microfiber sources in order to strip nanosized constituents there from as materials that meet the definition of nanofiber, above. In this manner, too, such peeled or stripped nanofibers will exhibit a fibrillated appearance and performance such that improvements in entanglement within the interstices of the microfibers during separator production may occur (not to mention the potential for improved entanglement between individual nanofibers prior to and/or during the same separator manufacturing procedure). In such a situation, the microfiber and nanofiber materials may thus be from the same material, with portions of the microfiber material removed to form the nanofiber constituents, and such nanofibers may have varying and multiple lengths as well as varied cross sections and overall sizes. In any event, nanofiber production may be undertaken in this manner with the removed constituents from the microfiber source collected and utilized in such forms with other types of microfibers, not just those from which such nanofibers have been provided. In such embodiments of the inventive battery separator, any type of nanofiber may be utilized for such a purpose. Preferably, however, the capability of providing nanofibers that exhibit potentially beneficial properties, such as high temperature stability, tensile strength, and the like, may create a situation wherein specific fiber types are utilized. As above, too, such nanofibers will exhibit, at least partially, in terms of specific structures or in terms of specific amounts present at a pre-determined level within the separator film or membrane, the requisite solubility/swelling characteristics in the presence of pre-determined electrolyte species.

Although such "fibrillated" nanofibers may be utilized are described, specifically produced nanofiber components may be incorporated with such microfiber base materials to permit the inventive result of a separator sheet with certain pore sizes produced through a wet-laid process. Such a manufacturing process thus includes the introduction of nanofiber components within a microfiber solution in a dilute wet state, mixing the same under high shear conditions, and then drying to form a resultant sheet. This sheet may then be calendered in order to reduce the sheet thickness as desired, but, in addition, to further dial in the optimal pore sizes and pore size distribution present therein. With a resilient sheet of properly dispersed and incorporated microfiber and nanofiber components, this wet-laid process permits suitable sheet production wherein the amount of nanofiber dictates the capacity to fill the interstices between microfiber constituents, thus creating the desired pores within the resultant sheet. The calendering operation may then permit a correlative value of sheet thickness to pore size, particularly due to the overall tensile strength of the sheet subsequent to wet-laid production. Such a process thus provides a relatively simple, yet elegant method to provide the capability of optimizing pore size distribution and size without having to extrude or otherwise manipulate the overall structure in a manner that may deleteriously tear, warp, and/or obfuscate the dimensional stability thereof. Additionally, the ability to utilize a simple microfiber/nanofiber/water solution for the sheet production process allows for, again, an elegant and simple method, but also one that reduces or even eliminates the need for other chemicals to impart the desired production scheme. Such a pure starting material and overall production method further underscores the highly unexpected benefits of not only the method employed for such an inventive product, but the simple combination of microfibers with nanofibers and an aqueous solute for such a purpose and yet to achieve a heretofore unattainable battery separator material on demand and with the versatility for multiple end uses.

Thus, it is of great importance for the inventive method and products that the nanofiber constituents combine with the microfibers under a sufficiently high shear environment to accord the desired introduction of such nanofibers onto and within the resultant microfiber nonwoven substrate simultaneously during actual nonwoven fabrication itself. In other words, upon the provision of both types of fiber materials within the nonwoven production process, the manufacturer should accord a sufficient amount of mixing and high shear conditions to best ensure the proper degree of entanglement between the different fiber types to form the desired single-layer fabric structure. As well, the fabrication method is potentially preferred as a wet-laid nonwoven procedure in addition to the high shear type, ostensibly to best ensure the proper introduction and residual location of nanofibers within the microfiber interstices. With an increased water flow during manufacture, the extremely small nanofibers will be drawn into such interstices at a greater rate than with a dry entanglement method, thereby according the aforementioned interstice fill capability. Again, the higher the water level for such a purpose, the greater purity (and recovery of water and excess fibers, for that matter, for further utilization in a separate battery separator manufacturing process) and reliability for suitable nanofiber entanglement within the microfiber base. The resultant nonwoven structure would thus exhibit greater uniformity in terms of thickness, porosity, and, most importantly, pore sizes, therein, as well as more reliable stability for calendering to optimize thickness and pore size results, as noted above.

One method followed for such a wet-aid procedure includes the provision of pre-fibrillated microfibers in a pulp-like formulation, comprising, for example, from 50:1 to 10000:1 parts water per part of fiber (again, water alone is preferred, although, if desired, other solvents that permit a wet-laid process and subsequent facilitation of evaporation thereof may be utilized, including, for instance, certain non-polar alcohols). The pre-fibrillated microfibers have been treated in such a manner, thus exhibiting a certain amount of already-present nanofibers (the residual product removed from the microfiber themselves during fibrillation, but not removed from the overall resultant mesh of microfibers thereafter). Such pre-fibrillated microfibers and nanofibers are in pulp form as a result of the fibrillation procedure, rendering a slurry-like formulation including the above-noted aqueous-based solvent with the resultant pre-fibrillated microfibers and nanofibers. This slurry-like formulation is then mixed with selected amounts of other microfibers and/or nanofibers (preferably in pulp- or slurry-like form, as well), or the initial slurry is mixed alone, and the resultant formulation can be heated in hot water to a temperature of at least 60° C., more preferably at least 70, and most preferably at least 80, having a very low concentration of actual fiber solids content therein (i.e., below 1% and as low as less than 0.1% by weight of water or other aqueous-based solvent). This heated dispersion is then subjected to a high shear environment with subsequent placement on a flat surface. Such a surface is sufficiently porous to allow for solvent elution, thus leaving the desired wet-laid nonwoven single fabric layer including fibrillated microfibers entangled with one another, and exhibiting interstices between each microfiber, as well as nanofibers present within such interstices and on the surface of the larger microfibers as well. The amount of added nanofibers to the pre-fibrillated microfiber pulp would thus accord greater amounts of fill between the microfiber interstices to provide an overall low mean pore size, particularly in comparison to a wetlaid nonwoven that is made solely from the pre-fibrillated pulp alone. Conversely, then, the addition of microfibers to the pre-fibrillated fiber slurry would accord a larger mean pore size to the resultant wetlaid nonwoven single layer fabric than the pre-fibrillated fiber slurry alone. This capability to target different mean pore sizes through nanofiber and/or microfiber addition levels accords the manufacturer the potential to achieve any desired mean pore size level.

Subsequent to such a high-shear mixing step, the resultant dispersion may be fed into the head of a paper machine (of any type that is capable of making light weight sheets without breaking, such as, as merely examples, Fourdrenier, Incline Wire, Rotoformer, and the like, devices). Such light weight sheets may be produced through controlling the fiber dispersion input in the head end with simultaneously controlled line speed. A set-up wherein no open draws are present (i.e., wherein the wet fiber web is unsupported) is preferred for such a method. In this situation, the high water level may be alleviated through vacuum means (which is a common step in the paper making industry), at least initially (i.e., to remove surface moisture to a certain level). For the proper thin sheet result, a fine gauge paper making wire is necessary, particularly at a gauge of at most 40 gauge, more preferably at most 80 gauge. The paper (dispersion sheet) width may be accorded any measurement as long as the production speed does not affect the end result and the overall tensile strength (particularly in an isotropic fashion) is not compromised. For efficiency purposes, the line speed may be set within a range of 25 to 1,500 ft/min, more preferably with a minimum of 50, and most preferably 1,000.

After such a paper (sheet) making step is accomplished, the formed sheet may be introduced within a drying device. Any type of standard drying means may be utilized, including heated steam cans or a hot air oven. Such heating should exceed the temperature necessary to evaporate the water (or other solvents), but should not be so high as to melt or deform the sheet itself. Such drying temperatures thus may depend upon the materials in use, as well as the sheet thicknesses, as certain materials may withstand higher temperatures than others in terms of dimensional stability and the thicker the sheet, typically the greater temperature resistance to warping or other effect.

The manufacturer may thus control the desired properties of the inventive battery separators through the capability of providing different thicknesses of the single-layer structure on demand as well. Such a thickness characteristic may be provided through the initial wet-laid fabrication method process parameters alone, or the manufacturer may subsequently calendar the resultant fabric to any desired thickness. The potential to calendar and otherwise alter the thickness of the resultant single layer fabric permits the manufacturer the further capability to allow for greater versatility in terms of both air resistance and mean pore size measurements. Such a dial-in process has yet to be explored within the battery separator industry. A calendering step utilizing typical devices, such as hard steel rolls, or a combination of a single hard steel roll and a second hard rubber roll, as merely examples, may be employed. Multiple calendering steps may be undertaken as well for such a purpose, if the materials can withstand such activities without any appreciable loss of tensile strength, etc., as noted above, as well.

Resultant thicknesses may thus be less than 250 micrometers, preferably less than 100 micrometers, more preferably less than 50 micrometers, even more preferably less than 35 micrometers, most preferably less than 25 micrometers. As noted above, the capability of preventing contact between the anode and cathode of the battery is necessary to prevent a shorted circuit during battery use; the thickness of the separator and the controlled pore size therein provide the essential manner of achieving such a result. However, battery separator thickness may also contribute to the available volume of other component parts within the closed battery cell as well as the amount of electrolyte solution provided therein. The entirety of the circumstances involved thus require an effective separator in terms of multiple variables. The beneficial ease of manufacture as well as the capability of providing effective on-demand pore size and air resistance properties through the inventive manufacturing method and the resultant single-layer battery separator made therefrom thus sets this development distinctly apart from the state of the art battery separators currently used and marketed today.

Other methods of nonwoven sheet manufacture which enable the entanglement of a combination of nanofibers and microfibers may also be used to create the inventive battery separators. One method would be to start with distinct nanofibers and microfibers and combine them in the method described above. Other such methods include carding, cross lapping, hydroentangling, air laid, needlepunch, melt blown, spunbond or other methods or combinations of methods that enable the microfibers to form an entangled mesh and the nanofibers to fill the interstices between said microfibers.

In effect, as noted above, the microfiber interstices form the "pores" per se, and the nanofibers fill in such openings to reduce the sizes therein, and to a substantially uniform degree over the entire nonwoven structure. Of highly unexpected benefit to the overall invention, particularly in terms of targeting different levels of porosity on demand, is the ability to dial in pore sizes within the resultant nonwoven structure through the mere modification of the concentration of microfibers to nanofibers alone. Thus, for example, a 70% microfiber to 30% nanofiber proportion at the nonwoven fabrication process outset would provide a pore size in the range of 500 nm to 1500 nm, whereas a 60% microfiber/40% nanofiber combination would provide an effectively smaller pore size distribution (as well as a more uniform range thereof). Such an unforeseen result thus accords an on-demand porosity result for the end user through, as noted, as rather simple manufacturing modification. Such pore sizes created can be measured, resulting in a mean flow pore size. Such mean flow pore sizes may be less than 2000 nm, even less than 1000 nm, preferably less than 700 nm, more preferably less than 500 nm.

Additionally, it should be noted that although a single-layer separator including microfibers and nanofibers together is encompassed within this invention, the utilization of multiple layers of such a fabric structure, or of a single layer of such an inventive battery separator fabric with at least one other layer of a different type of fabric, may be employed and still within the scope of the overall invention described herein.

Such battery separators as described herein are clearly useful for improving the art of primary and rechargeable batteries, but also may be used for other forms of electrolyte conducting energy storage techniques, such as capacitors, supercapacitors and ultracapacitors. Indeed, the control allowed on the pore size for such inventive separators may allow significant improvements in the energy loss, power discharge rate, and other properties of these devices.

DETAILED DESCRIPTION OF THE DRAWINGS AND PREFERRED EMBODIMENTS

Figure 1:
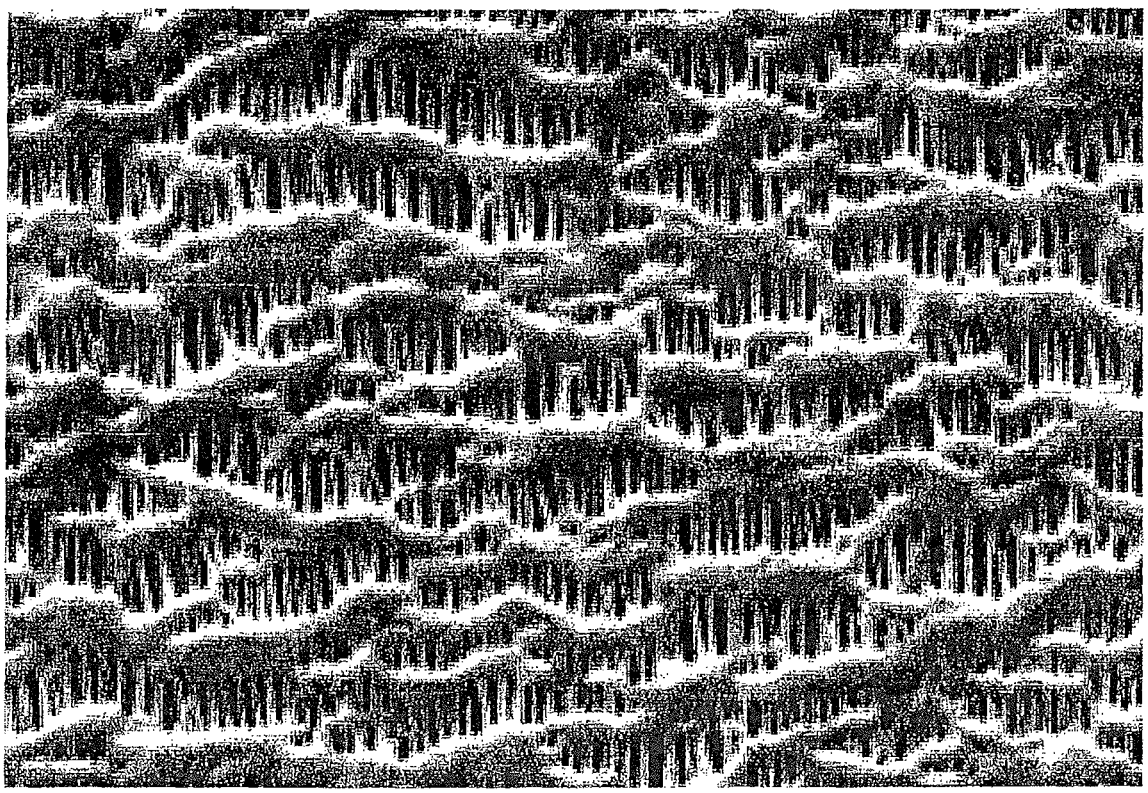
FIG. 1 is an SEM microphotograph of a prior art expanded film battery separator.

All the features of this invention and its preferred embodiments will be described in full detail in connection with the following illustrative, but not limiting, drawings and examples.

Microfiber and Nanofiber Production

As noted above, the microfiber may be constructed from any polymer (or polymer blend) that accords suitable chemical and heat resistance in conjunction with internal battery cell conditions, as well as the capability to form suitable fiber structures within the ranges indicated. Such fibers may further have the potential to be treated through a fibrillation or like technique to increase the surface area of the fibers themselves for entanglement facilitation during nonwoven fabrication. Such fibers may be made from longstanding fiber manufacturing methods such as melt spinning, wet spinning, solution spinning, melt blowing and others. In addition, such fibers may begin as bicomponent fibers and have their size and/or shape reduced or changed through further processing, such as splittable pie fibers, islands-in-the-sea fibers and others. Such fibers may be cut to an appropriate length for further processing, such lengths may be less than 50 mm, or less than 25 mm, or less than 12 mm even. Such fibers may be also be made long to impart superior processing or higher strength to have a length that is longer than 0.5 mm, longer than 1 mm, or even longer than 2 mm. Such fibers may also be fibrillated into smaller fibers or fibers that advantageously form wet-laid nonwoven fabrics.

Nanofibers for use in the current invention may be made through several longstanding techniques, such as islands-in-the-sea, centrifugal spinning, electrospinning, film or fiber fibrillation, and the like. Teijin and Hills both market potentially preferred islands-in-the-sea nanofibers (Teijin's is marketed as NanoFront fiber polyethylene terephthalate fibers with a diameter of 500 to 700 nm). Dienes and FiberRio are both marketing equipment which would provide nanofibers using the centrifugal spinning technique. Xanofi is marketing fibers and equipment to make them using a high shear liquid dispersion technique. Poly-aramids are produced by duPont in nanofiber state that exhibit excellent high temperature resistance, as well as other particularly preferred properties.

Electrospinning nanofiber production is practiced by duPont, E-Spin Technologies, or on equipment marketed for this purpose by Elmarco. Nanofibers fibrillated from films are disclosed in U.S. Pat. Nos. 6,110,588, 6,432,347 and 6,432,532, which are incorporated herein in their entirety by reference. Nanofibers fibrillated from other fibers may be done so under high shear, abrasive treatment. Nanofibers made from fibrillated cellulose and acrylic fibers are marketed by Engineered Fiber Technologies under the brand name EFTEC™. Any such nanofibers may also be further processed through cutting and high shear slurry processing to separate the fibers an enable them for wet laid nonwoven processing. Such high shear processing may or may not occur in the presence of the required microfibers.

Nanofibers that are made from fibrillation in general have a transverse aspect ratio that is different from those made initially as nanofibers in typical fashion (islands-in-the-sea, for instance). One such transverse aspect ratio is described in full in U.S. Pat. No. 6,110,588, which is incorporated herein by reference. As such, in one preferred embodiment, the nanofibers have a transverse aspect ratio of greater than 1.5:1, preferably greater than 3.0:1, more preferably greater than 5.0:1.

As such, acrylic, polyester, and polyolefin fibers are particularly preferred for such a purpose, with fibrillated acrylic fibers, potentially most preferred. Again, however, this is provided solely as an indication of a potentially preferred type of polymer for this purpose and is not intended to limit the scope of possible polymeric materials or polymeric blends for such a purpose.

Figure 2:
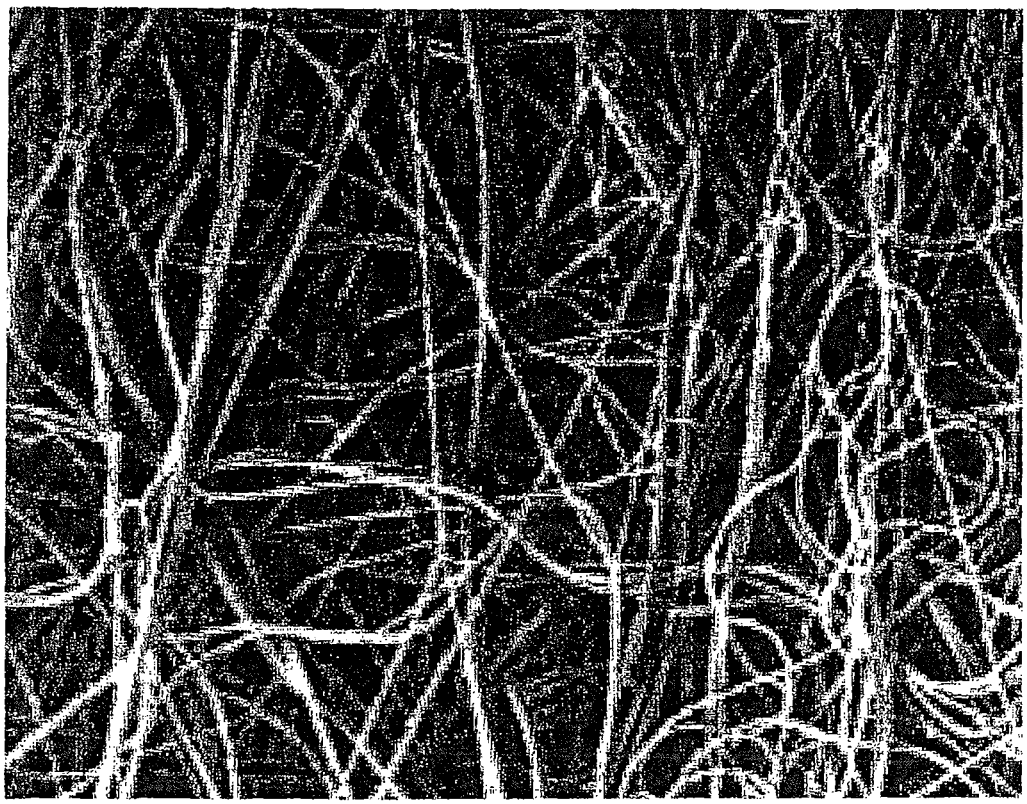
FIG. 2 is an SEM microphotograph of a prior art nanofiber nonwoven fabric battery separator.

FIGS. 1 and 2 provide photomicrographs of the typical structures of the Celgard expanded film materials and the duPont nanofiber nonwoven battery separator materials, respectively, and as discussed above. Noticeably, the film structure of the Celgard separator shows similarity in pore sizes, all apparently formed through film extrusion and resultant surface disruptions in a rather uniform format. The duPont separator is made strictly from nanofibers alone as the uniformity in fiber size and diameter is evident. Being a nonwoven structure of such nanofibers themselves, the overall tensile strengths of this separator in both machine and cross directions are very low, although roughly uniform in both directions. Thus, such a material may be handled uniformly, as a result, although overall strength lends itself to other difficulties a manufacturer must face, ultimately, if introducing such a separator into a battery cell. To the contrary, then, the FIG. 1 separator, showing the striations for pore generation in the same direction (and thus extrusion of the film in one direction), provides extremely high machine direction tensile strength; unfortunately, the tensile strength of the same material in the cross direction is very low, leaving, as discussed previously, a very difficult and highly suspect battery separator material to actually utilize in a battery manufacturing setting.

Figure 3:
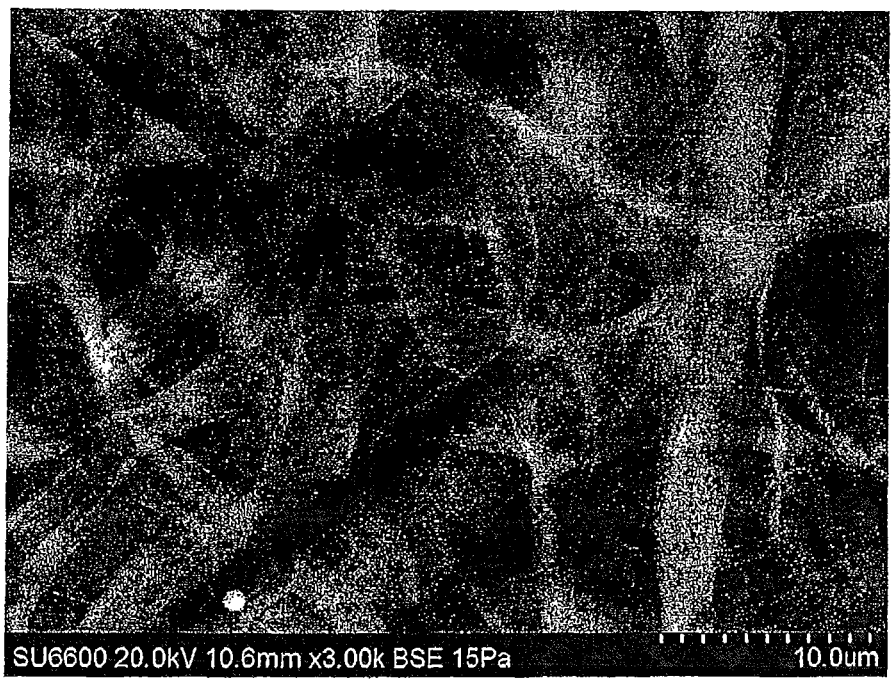
FIGS. 3 and 4 are SEM microphotographs of one potentially preferred embodiment of an inventive microfiber/nanofiber nonwoven fabric battery separator structure.
Figure 4:
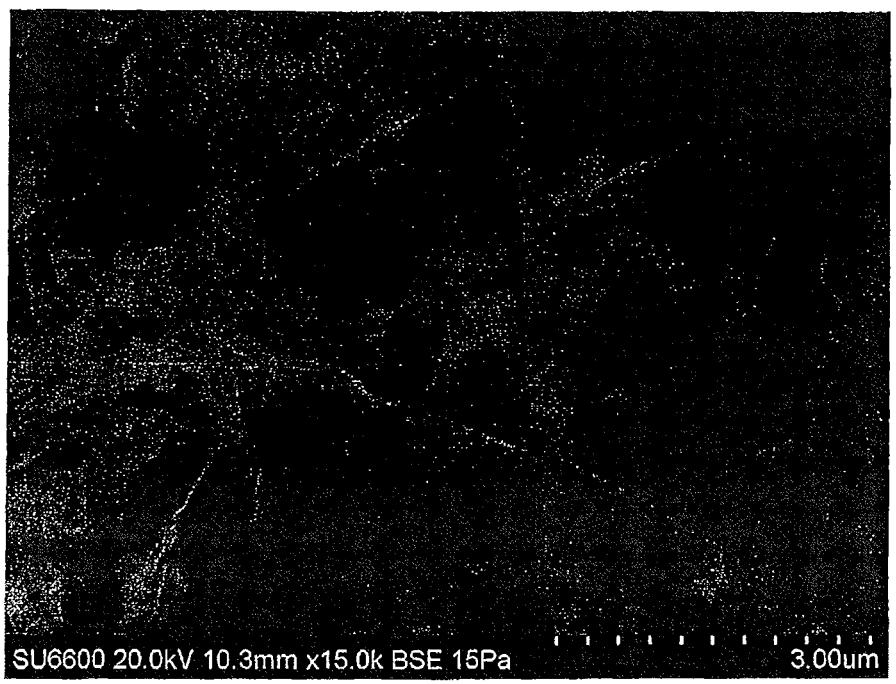
Figure 5:
FIGS. 5, 6, and 7 are SEM microphotographs of another potentially preferred embodiment of an inventive microfiber/nanofiber nonwoven fabric battery separator structure.
Figure 6:
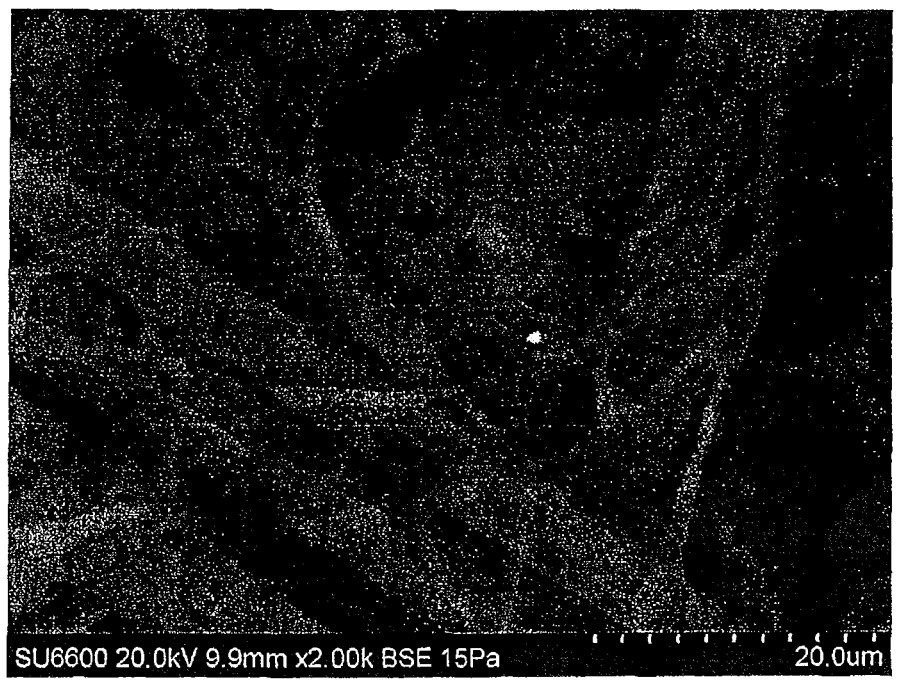
Figure 7:
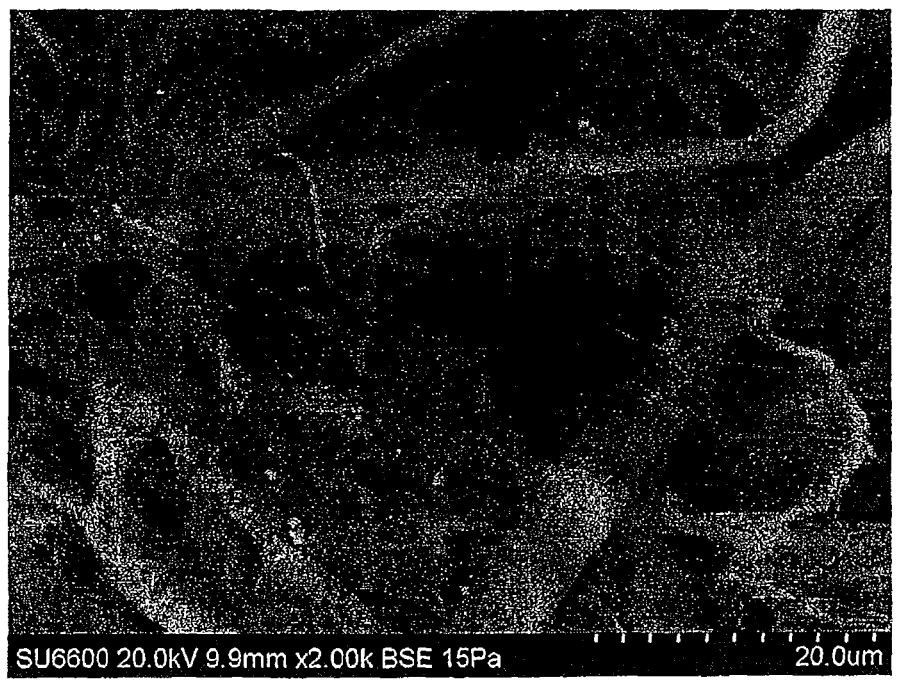

The inventive materials, shown in photomicrograph form in FIGS. 3 and 4, are of totally different structure from these two prior art products. One potentially preferred embodiment of the initial combination of microfiber and nanofibers is the EFTEC™ A-010-4 fibrillated polyacrylonitrile fibers, which have high populations of nanofibers as well as residual microfibers. The resultant nanofibers present within such a combination are a result of the fibrillation of the initial microfibers. Nonwoven sheets made of these materials are shown in FIGS. 3 and 4. By way of example, these fibers can be used as a base material, to which can be added further microfibers or further nanofibers as a way of controlling the pore size and other properties of the nonwoven fabric, or such a material may be utilized as the nonwoven fabric battery separator itself. Examples of such sheets with additional microfibers added are shown in FIGS. 5, 6 and 7. Typical properties of the acrylic Micro/Nanofibers are shown below.

TABLE 1

| Acrylic Micro/Nanofiber Properties | |
|---|---|
| Density, g/cm$^3$ | 1.17 |
| Tensile Strength, MPa | 450 |
| Modulus, GPa | 6.0 |
| Elongation, % | 15 |
| Typical Fiber Length, mm | 4.5-6.5 |
| Canadian Standard Freeness, ml | 10-700 |
| BET Surface Area, m$^2$/g | 50 |
| Moisture Regain, % | <2.0 |
| Surface Charge | Anionic |

Such fibers are actually present, as discussed above, in a pulp-like formulation, thereby facilitating introduction within a wetlaid nonwoven fabric production scheme.

Nonwoven Production Method

Material combinations were then measured out to provide differing concentrations of both components prior to introduction together into a wet-laid manufacturing process. Handsheets were made according to TAPPI Test Method T-205, which is incorporated here by reference (basically, as described above, mixing together in a very high aqueous solvent concentration formulation and under high shear conditions as are typically used in wet laid manufacturing and described as "refining" of fibers, ultimately laying the wet structure on a flat surface to allow for solvent evaporation). Several different combinations were produced to form final nonwoven fabric structures. The method was adjusted only to accommodate different basis weights by adjusting the initial amount of material incorporated into each sheet. Materials and ratios are shown in Table 2.

FIGS. 5, 6, and 7 correlate in structure to Example 3 below, as well. The similarity in structure (larger microfibers and smaller nanofibers) are clarified, and the presence of fewer amounts of nanofibers in these structures is evident from these photomicrographs, as well.

The fabric was measured for thickness and then cut into suitable sizes and shapes for introduction within lithium ion rechargeable battery cells. Prior to any such introduction, however, samples of the battery separator fabrics were analyzed and tested for various properties in relation to their capability as suitable battery separators. Furthermore, comparative examples of battery separator nanofiber membranes according to U.S. Pat. No. 7,112,389, which is hereby incorporated by reference, as well as battery separator films from Celgard, are reported from the tests in the patent and from Celgard product literature.

EXAMPLES

Examples 36-51 were made according to TAPPI Test Method T-205 using Engineered Fiber Technologies EFTEC™ A-010-04 fibrillated acrylic fiber (combination of microfiber and nanofiber)(listed as Base Fiber) and FiberVisions T426 fiber, which is 2 denier per filament, cut to 5 mm length, a bicomponent fiber made from polypropylene and polyethylene, and has a diameter of approximately 17 microns (listed as Added Fiber). The sheets were calendered between two hard steel rolls at 2200 pounds/linear inch at room temperature (~25 C). The amount of each fiber, conditioned basis weight, caliper (or thickness), apparent density and porosity of the examples are shown in Table 4. Conditioned Basis Weight, Caliper, Apparent Density, and Tensile were tested according to TAPPI T220, which is hereby incorporated by reference.

TABLE 2

Separator Properties

| Example | % Base Fiber | % Added Fiber | Conditioned Basis Wt g/m² | Caliper mm | Apparent Density g/cm³ | Porosity % |
|---|---|---|---|---|---|---|
| 36 | 100 | 0 | 39.9 | 0.065 | 0.614 | 56.2% |
| 37 | 90 | 10 | 40.2 | 0.067 | 0.600 | 55.6% |
| 38 | 80 | 20 | 39.8 | 0.068 | 0.585 | 55.0% |
| 39 | 70 | 30 | 39.9 | 0.07 | 0.570 | 54.4% |
| 40 | 100 | 0 | 29.98 | 0.051 | 0.588 | 58.0% |
| 41 | 90 | 10 | 29.89 | 0.053 | 0.564 | 58.2% |

TABLE 2-continued

Separator Properties

| Example | % Base Fiber | % Added Fiber | Conditioned Basis Wt g/m² | Caliper mm | Apparent Density g/cm³ | Porosity % |
|---|---|---|---|---|---|---|
| 42 | 80 | 20 | 28.91 | 0.054 | 0.535 | 58.8% |
| 43 | 70 | 30 | 30.9 | 0.074 | 0.418 | 66.6% |
| 44 | 100 | 0 | 23.58 | 0.044 | 0.536 | 61.7% |
| 45 | 90 | 10 | 24.8 | 0.046 | 0.539 | 60.1% |
| 46 | 80 | 20 | 24.75 | 0.047 | 0.527 | 59.5% |
| 47 | 70 | 30 | 24.15 | 0.053 | 0.456 | 63.5% |
| 48 | 100 | 0 | 14.8 | 0.03 | 0.493 | 64.8% |
| 49 | 90 | 10 | 16.6 | 0.036 | 0.461 | 65.8% |
| 50 | 80 | 20 | 16.4 | 0.033 | 0.497 | 61.8% |
| 51 | 70 | 30 | 16.5 | 0.037 | 0.446 | 64.3% |

The higher the porosity, the higher the peak power output within the subject battery. With such high results, theoretically, at least, the number of batteries necessary to accord the necessary power levels to run certain devices (such as hybrid automobiles, for instance) would be reduced through an increase in the available power from individual batteries. Such a benefit would be compounded with an effective air resistance barrier as well. The porosity of the inventive separator may also be controlled by the ratio of nanofiber to microfibers, the types of nanofibers, and also by post processing such as calendaring, as can be seen below.

Battery Separator Base Analysis and Testing

The test protocols were as follows:

Porosity was calculated according to the method in U.S. Pat. No. 7,112,389, which is hereby incorporated by reference. Results are reported in %, which related to the portion of the bulk of the separator that is filled with air or non-solid materials, such as electrolyte when in a battery.

Gurley Air Resistance was tested according to TAPPI Test Method T460, which is hereby incorporated by reference. The instrument used for this test is a Gurley Densometer Model 4110. To run the test, a sample is inserted and fixed within the densometer. The cylinder gradient is raised to the 100 cc (100 ml) line and then allowed to drop under its own weight. The time (in seconds) it takes for 100 cc of air to pass through the sample is recorded. Results are reported in seconds/100 cc, which is the time required for 100 cubic centimeters of air to pass through the separator.

Mean Flow Pore Size was tested according to ASTM E-1294 "Standard Test Method for Pore Size Characteristics of Membrane Filters Using Automated Liquid Porosimeter" which uses an automated bubble point method from ASTM F 316 using a capillary flow porosimeter. Tests were performed by Porous Materials, Inc., Ithaca, N.Y.

The air permeability of a separator is a measurement of the time required for a fixed volume of air to flow through a standard area under light pressure. The procedure is described in ASTM D-726-58.

TABLE 3

Tensile properties and Mean Flow Pore Size

| Example | MD Tensile kg/cm² | CD Tensile kg/cm² | Mean Flow Pore Size microns |
|---|---|---|---|
| 36 | 94 | 94 | 0.13 |
| 37 | 85 | 85 | 0.13 |
| 38 | 67 | 67 | 0.15 |
| 39 | 59 | 59 | 0.20 |
| 40 | 88 | 88 | 0.15 |

TABLE 3-continued

Tensile properties and Mean Flow Pore Size

| Example | MD Tensile kg/cm² | CD Tensile kg/cm² | Mean Flow Pore Size microns |
|---|---|---|---|
| 41 | 69 | 69 | 0.18 |
| 42 | 51 | 51 | 0.25 |
| 43 | 29 | 29 | 0.62 |
| 44 | 74 | 74 | 0.19 |
| 45 | 65 | 65 | 0.23 |
| 46 | 56 | 56 | 0.27 |
| 47 | 40 | 40 | 0.69 |
| 48 | 52 | 52 | |
| 49 | 57 | 57 | |
| 50 | 42 | 42 | |
| 51 | 34 | 34 | |

The inventive example thus shows a very small pore size mean, indicating a capability to permit a large number of recharge cycles for the subject battery. In addition, the ability to control the pore size is indicated by the change in pore size with the proportional change in the ratio of nanofiber and microfiber materials. This is a key advantage that is not present in any previous art, such that with this technology the pore size can be dialed in by the battery manufacturer depending on the requirements of the end user. Thus, a separator can be designed for a power tool or automotive application to have different characteristics from a rechargeable watch battery, cell phone or laptop computer.

The tensile properties in the examples given are isotropic, that is, the same in all directions, with no distinction between machine and cross directions. Comparative examples show tensile properties that vary considerably between machine direction (MD) and cross direction (CD) tensile strength. In general, nanofiber-based battery separators are quite weak. Thus, one advantage of the current invention is the tensile strength, which allows faster processing in battery manufacture, tighter winding of the batteries, and more durability in battery use. Such MD tensile strength is preferably greater than 25 kg/cm², more preferably greater than 50 kg/cm², and most preferably greater than 100 kg/cm². The requirements on the CD tensile strength are lower, preferably being greater than 10 kg/cm², more preferably being greater than 25 kg/cm², and most preferably greater than 50 kg/cm².

As noted above, calendering and an increased population of nanofibers relative to microfibers will reduce the overall pore size mean, even further, thus indicating, again, the ability to target certain measurements on demand for the inventive technology. Sheet production of the initial separator was then undertaken on a paper making machine (to show manufacturing may be simplified in such a manner) with such a calendering, etc., step undertaken as well.

Paper Machine Production

Two materials were then made on a rotoformer paper machine. The first, Example 52, was made from 75% EFTec A-010-4 and 25% 0.5 denier/filament polyethylene terephthalate (PET) fiber with cut length 6 mm. The second, Example 53, was made from 37.5% EFTec A-010-4, 37.5% EFTec L-010-4 and 25% PET fiber with cut length 6 mm. The fiber materials were dispersed using high shear mixing and mixed at high dilution in water, then fed into the rotoformer head box and made to sheets of weight 20 grams/m² and dried in a hot air oven. The resultant rolls were calendered at 325° F. at 2200 pounds/linear inch, resulting in thicknesses of ~40 microns for the first sheet and 30 microns for the second sheet. Shrinkage was measured at 90° C., 130° C., and 160° C. by measuring a 12" length in each of machine and cross direction, placing in an oven stabilized at the measuring temperature for 1 hour, and measuring the length again. The shrinkage is the change in length expressed as a percentage of the original length. Properties of the sheets are shown below in Table 4.

TABLE 4

Membrane Properties

| Basic Membrane Property | Unit of Measure | Example 52 | Example 53 |
|---|---|---|---|
| Thickness | μm | 40 | 30 |
| Gurley (JIS) | seconds | 20 | 110 |
| Porosity | % | 60% | 55% |
| Mean Flow Pore Size | μm | 0.5 | 0.5 |
| TD Shrinkage @ 90 C./1 Hour | % | 0 | 0 |
| MD Shrinkage @ 90 C./1 Hour | % | 0 | 0 |
| TD Shrinkage @ 130 C./1 Hour | % | 0 | 0 |
| MD Shrinkage @ 130 C./1 Hour | % | 2 | 1 |
| TD Shrinkage @ 160 C./1 Hour | % | 1 | 0 |
| MD Shrinkage @ 160 C./1 Hour | % | 4 | 2 |
| TD Shrinkage @ 190 C./1 Hour | % | 5 | 0 |
| MD Shrinkage @ 190 C./1 Hour | % | 7 | 2 |
| TD Strength | Kg/cm² | 70 | 100 |
| MD Strength | Kg/cm² | 190 | 170 |
| Elongation | % | 4% | 4% |

As can be seen, the materials with both acrylic (EFTec A-010-4) and lyocell (EFTec L-010-4) materials show very good properties at high temperature. For example, many current stretched film separators may be made from polyethylene, which melts at 135° C. and shows significant shrinkage at over 110° C., or from polypropylene, which melts at 160° C. and shows significant shrinkage over 130° C. One problem that is known in the industry, especially for large format cells that might be used in electric vehicles, is that shrinkage upon exposure to high temperature can expose the electrodes to touching each other on the edges if the separator shrinks, causing a short and potentially a catastrophic thermal runaway leading to an explosion. Separators with high temperature stability thus are safer in these environments, allowing larger format cells to be used with higher energy per cell. Preferred separator performance might be to have less than 10% shrinkage at 130° C., 160° C. or 190° C. in both directions, or preferably less than 6% shrinkage or most preferably less than 3% shrinkage. In addition, the separator might be made with a component that has high temperature stability such as a lyocell, rayon, para-aramid, meta-aramid, or other fiber, that when formed into a sheet with other materials imparts a low shrinkage result, as is shown in Example 53.

Additional examples were made and tested for different calendering conditions. The paper was constructed on a Rotoformer at the Herty Foundation facility, and consisted of 27% EFTec A-010-04 acrylic nanofiber, 53% EFTec L-010-04 lyocell nanofiber, and 20% 0.5 denier/filament polyester fiber with 5 mm cut length. The materials were mixed for 40 minutes in a 1000 gallon hydropulper, and then fed into the machine at approximately 0.25% fiber content, and a sheet made that was 15 grams/m² in areal density. This paper was calendered under different conditions, which are listed below and shown as Examples 56-60 in the Table 5 below.

Legend for Examples 56-60

56: Calendered using the conditions above, except the rolls were not heated.
57: Sheet was fed through the calender with a second sheet of Example 56, plying the sheets together.
58: Sheet from 56 was fed through the calender with a roll of copy paper (need wt??), then peeled from the copy paper.
59: Sheet from 56 was calendered with a second pass under the same conditions.
60: The plies of 57 were peeled apart, resulting in two separate sheets.

Two things can be seen from the examples below. First, the lamination of two sheets gives more than twice the Gurley air resistance of a single sheet, while lowering the total porosity. Second, calendaring a second time had the effect of increasing the porosity and lowering the Gurley. Last, the two sheets that were fed through with another sheet had the effect of increasing the Gurley and increasing the porosity at the same time. Tensile strength was decreased in all cases with additional calendering.

TABLE 5

Calendered Sheet Results

| Example | Conditioned Basis Wt g/m$^2$ | Caliper mm | Apparent Density g/cm$^3$ | Porosity % | MD Tensile kg/cm$^2$ | CD Tensile kg/cm$^2$ | Gurley Air Resistance seconds |
|---|---|---|---|---|---|---|---|
| 56 | 14.7 | 0.031 | 0.474 | 59.6% | 155 | 69 | 38 |
| 57 | 30.0 | 0.060 | 0.500 | 57.4% | 136 | 53 | 105 |
| 58 | 15.2 | 0.037 | 0.412 | 64.9% | 102 | 44 | 48 |
| 59 | 15.1 | 0.036 | 0.419 | 64.2% | 99 | 40 | 34 |
| 60 | 15.0 | 0.036 | 0.415 | 64.6% | 94 | 43 | 40 |

Wettability Testing

A square of Example 39 was taken along with a square of Celgard 2320, and a drop of 1 M LiPF6 in EC:DMC:DEC mixture (1:1:1 by volume) electrolyte was placed on the surface. After 5 seconds, the electrolyte had been completely absorbed into Example 39, with no spectral reflectance (as from the shiny surface of a liquid drop) observable. The electrolyte drop on the Celgard 2320 remained for several minutes. This is highly desirable for a lithium ion battery separator to increase the processing rate of dispersing the electrolyte, as well as to ensure uniform dispersion of the electrolyte. Non-uniform dispersion of the electrolyte is known to promote dendrite formation on repeated charge and discharge, which become defects in the cells and can lead to short circuits.

As such, it may be desirable to have a separator upon which the spectral reflectance of a drop of electrolyte deposited on the material disappears is less than 5 minutes, or less than 2 minutes, or more preferably less than 1 minute. In addition, it may be desirable to make an energy storage device from two electrodes, a separator and an electrolyte, such that the spectral reflectance of a drop of said electrolyte deposited on the separator disappears in less than 5 minutes, or less than 2 minutes, or more preferably less than 1 minute.

Other tests were undertaken involving Differential Scanning calorimetry and Thermogravimetric Analysis for Wettability measurements as well. Example 53 was tested for thermogravimetric analysis from room temperature to 1000° C. The sample showed 1.39% mass loss, ending near 100° C., which is consistent with water loss from the cellulose nanofibers and microfibers. The material showed no further degradation until approximately 300° C., when oxidation set in and a sharp decrease of approximately 60% mass between 335 and 400° C. The Example 53 was also tested for differential scanning calorimetry from room temperature to 300° C. There was a broad exotherm centered around 100° C., consistent with a release of water, and a sharper exotherm at 266° C. which onset at 250° C., consistent with the melting point of PET.

Example 52 was tested for thermogravimetric analysis from room temperature to 1000° C. The sample showed very little mass loss below 300° C., with an onset of mass loss at 335° C., and an approximately 40% mass loss up to 400° C. The Example 52 was also tested for differential scanning calorimetry from room temperature to 300° C. There was almost no signature shown between room temperature and a sharp exotherm at 266° C., onset at 250° C., consistent with the melting point of PET. In short, the curve showed no signature other than the melting of the PET microfibers.

Electrolyte Solvent Resistance Tests

In addition to the wettability (horizontal wicking) test undertaken above, a vertical wicking analysis was made with a separator sample dipped into an electrolyte solution (as for the wettability test) for 1 hour with upward migration measured every ten minutes. Another test was a Soxhlet extraction procedure wherein an immersed sample was then placed in a solvent solution and such was allowed to reflux for 5 hours, upon which the weight loss of the sample was recorded in relation to the added electrolyte solution prior to the reflux test. As well, a 24 hour soak test was also performed to determine any weight loss upon exposure to an electrolyte solvent on the sample separator thereafter. In each test, the end result was to determine whether the separator was retaining electrolyte solvent rather than merely providing a temporary site for solvent migration.

In terms of vertical wicking, the Example of 39, above, was tested for acetonitrile, diethyl carbonate, dimethyl carbonate, and propylene carbonate as electrolyte solvents. As a comparison with a standard CELGARD polypropylene separator film (which exhibits little vertical wicking, generally), the Example 39 separator allowed a certain percent increase over the CELGARD sample for the first three electrolyte solvents; however, for the propylene carbonate formulation, a solvent in which polyacrylonitrile nanofibers are highly soluble and exhibit swelling, the vertical wicking result was similar to the polypropylene separator, denoting the presence of a gel within the film structure impeding solvent wicking therein.

With the Soxhlet extraction test, the same results were basically found as the extraction level of the solvent indicated a range of about 2 to 5% extractables in the solvent removed from the materials. However, in propylene carbonate, the samples containing PAN nanofibers absorbed the solvent and prevented solvent reflux, again indicating gelation. The 24 hour soak extraction was even more telling, particularly with a propylene carbonate solvent in that the weight gain in relation to solvent presence was positive for this solvent and more than 100% of the mass of PAN fibers, as opposed to weight loss for the others. In essence, then, the results indicate that a gel is present when the Example 39 film (with polyacrylonitrile nanofibers present) is exposed to propylene carbonate. In such a situation, these PAN nanofibers are actually ionic conductive in a propylene carbonate solvent, thus according an increase in electronic separation within the separator film and gel resultant structure without any significant reduction in ionic transport capability. Fiber-electrolyte combinations that exhibit at least 50%, or preferably at least 100%, or more preferably at least 200% electrolyte solubility within the fiber are preferred. With the potential, then, to actually gel an electrolyte solution in situ rather than prior to battery cell introduction, particularly through the utilization of a battery separator rather than an atypical battery component, the potential for greater efficiencies within the rechargeable battery industry appear to be boundless.

Battery Formation

Figure 8:
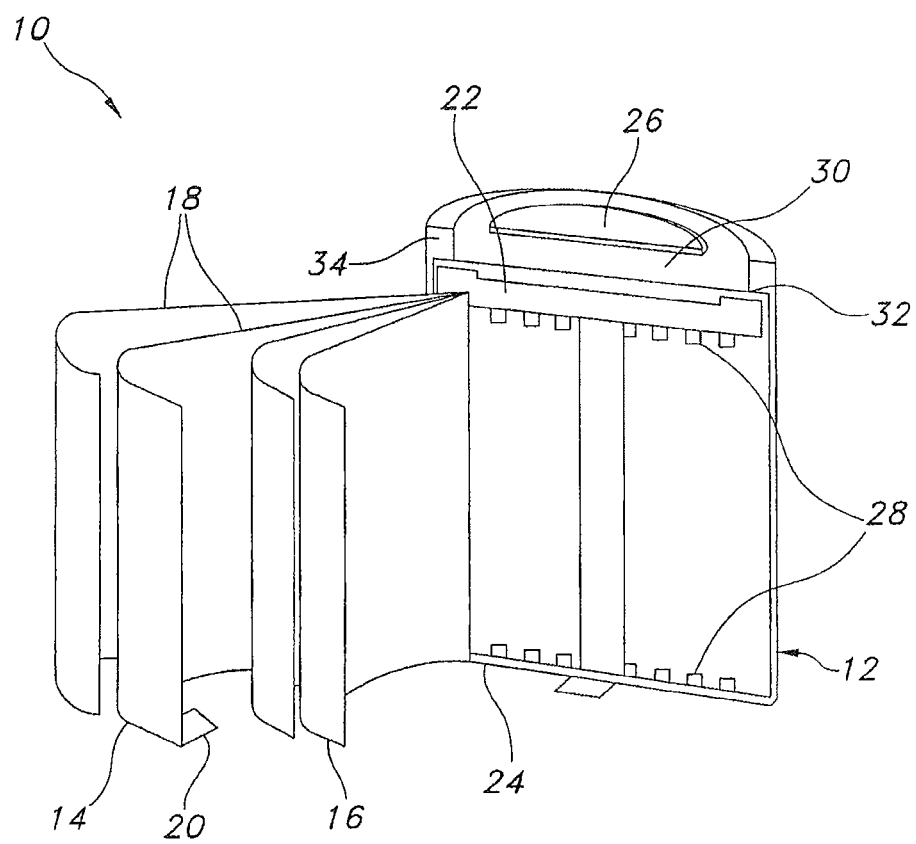
FIG. 8 shows an exploded view of an inventive rechargeable lithium ion battery including an inventive battery separator.

FIG. 8 shows the typical battery 10 structure with the outside housing 12 which includes al of the other components and being securely sealed to prevent environmental contamination into the cell as well as any leakage of electrolyte from the cell. An anode 14 is thus supplied in tandem with a cathode 16, with at least one battery separator 18 between the two. An electrolyte 20 is added to the cell prior to sealing to provide the necessary ion generation. The separator 18 thus aids in preventing contact of the anode 14 and cathode 16, as well as to allow for selected ion migration from the electrolyte 20 therethrough. The general format of a battery cell follows this structural description, albeit with differing structures sizes and configurations for each internal component, depending on the size and structure of the battery cell itself. In this situation, button battery of substantially circular solid components were produced for proper testing of separator effectiveness within such a cell.

To that end, a battery was then formed in such manner through the utilization of the film from Example 39 as the separator component and the electrolyte from the Wettability Test above was added in that manner. Upon closing of the cell, the battery was allowed to settle for 1 hour. Upon reopening, a slight gel was detected on the film surface from the reaction of the PC and the PAN fibers, therein. Such a result was not noticed with a CELGARD comparative film to any extent with any tested electrolyte sample.

It should be understood that various modifications within the scope of this invention can be made by one of ordinary skill in the art without departing from the spirit thereof. It is therefore wished that this invention be defined by the scope of the appended claims as broadly as the prior art will permit, and in view of the specification if need be.

I claim:

1. A method of providing direct electrolyte gelling in a lithium ion energy storage separator, wherein said electrolyte comprises solvents, wherein said separator consists of a single layer of fabric including microfibers exhibiting a minimum width of 3000 nm and nanofibers exhibiting a maximum width of 1000 nm, wherein at least some of said nanofibers exhibit gelation upon contact with said solvents; wherein said microfibers form a mesh and said nanofibers fill within the interstices of said microfibers; wherein said single layer of fabric exhibits a maximum thickness of 100 micrometers; wherein said single layer of fabric exhibits a mean flow pore size of at most 0.80 micrometers; and wherein said microfibers exhibit an average length of less than 50 mm, said average length further being at least 5 times the average length of said nanofibers; said method comprising the steps of:
   a) providing said separator;
   b) introducing said separator within a lithium ion battery;
   c) contacting said separator with said electrolyte within said battery and sealing said battery; and
   d) gelling said electrolyte through exposure to said at least some of said gelling nanofibers within said sealed battery.

2. The method of claim 1 wherein said nanofibers present within said single layer of fabric exhibit an average diameter of at most 700 nm.

* * * * *